United States Patent [19]

Uramoto et al.

[11] Patent Number: 5,375,079
[45] Date of Patent: Dec. 20, 1994

[54] ARITHMETICAL UNIT INCLUDING ACCUMULATING OPERATION

[75] Inventors: Shinichi Uramoto; Kazuya Ishihara, both of Hyogo, Japan

[73] Assignee: Mitsubishi Denki Kabushiki Kaisha, Tokyo, Japan

[21] Appl. No.: 9,529

[22] Filed: Jan. 27, 1993

[30] Foreign Application Priority Data

Feb. 3, 1992 [JP] Japan ................... 4-047517

[51] Int. Cl.⁵ ............... G06F 7/38; G06F 7/50
[52] U.S. Cl. .................... 364/736; 364/768
[58] Field of Search ............ 364/715.01, 736, 748, 364/768, 784, 747

[56] References Cited

U.S. PATENT DOCUMENTS

| 4,719,589 | 1/1988 | Tanaka | 364/748 |
| 5,040,136 | 8/1991 | Kanoh | 364/715.01 |
| 5,208,770 | 5/1993 | Ito | 364/768 |

FOREIGN PATENT DOCUMENTS

0309348 9/1988 European Pat. Off. .
716765 7/1973 France .

OTHER PUBLICATIONS

*Patent Abstracts of Japan*, vol. 2, No. 88 (E-044) Jul. 19, 1978 (JP-A-53051936, Hitachi Seisakusho KK) May 11, 1978.
*IBM Technical Disclosure Bulletin*, vol. 32, No. 1, Jun. 1989, New York, N.Y. PP. 13-14 XP000033229, "High Speed Incrementer".
*Electronic Engineering*, vol. 49, No. 588, Feb. 1977, London, GB, p. 18, "Accumulating Adder Works with Reversible Counter," K. Westowski.
*IBM Technical Disclosure Bulletin*, vol. 21, No. 3, Aug. 1978, pp. 1082-1083, "Sum of Absolute Values under Control of ALU Sign Bit," J. Beraud, et al.
*Patent Abstracts of Japan*, vol. 7, No. 249, p. 234, Nov. 1983 (JP-A-58132861, Tokyo Shibaura Denki KK) Aug. 1983.
*IEEE Journal of Solid-State Circuits*, vol. SC-21, No. 5, 1986 "A Digital Processor for Decoding Composite TV Signals Using Adaptive Filtering," Kenji Murakami, et al.
*IEEE 1990 Custom Integrated Circuits Conference* "A Flexible Motion-Vector Estimation Chip for Real-Time Video Codecs," Yang, et al.

Primary Examiner—Stephen M. Baker
Assistant Examiner—Chuong D. Ngo
Attorney, Agent, or Firm—Townsend and Townsend Khourie and Crew

[57] ABSTRACT

An improved M-bit accumulator for increasing speed and reducing circuit size includes an N-bit (N<M) adder, a first latch having an input coupled to the output of the adder and an output coupled to an input of the adder for latching the adder output when a first clock signal is asserted, an (M-N) bit incrementer, a second latch having an input coupled to the output of the incrementer and an output coupled to the input of the incrementer for latching the incrementer output when a second clock signal is asserted, and a clock generating circuit for asserting the second clock signal in synchronism with the first clock signal only when a carry signal is generated by the adder.

5 Claims, 4 Drawing Sheets

ARITHMETICAL UNIT INCLUDING ACCUMULATING OPERATION

BACKGROUND OF THE INVENTION

1. Field of the Invention

The present invention relates to an arithmetical unit for performing accumulating operation.

2. Description of the Prior Art

FIG. 4 shows an existing arithmetical unit including accumulating operation. In FIG. 4, symbol 31 is an adder for performing accumulating operation and 32 is storing means for updating the stored data in response to a clock signal inputted from a clock input terminal 5. Symbol 4 is an input terminal and 6 is an output terminal. The input terminal deals with N bits and the output terminal deals with M bits. Because accumulating operation result is generally larger than input in dynamic range, generality is not lost even for N<M. N-bit input data is supplied to a first input 31a of the adder 31 through the input terminal 4. The output of the storing means 32 is supplied to a second input 31b of the adder 31 as M-bit output data through the output terminal 6. The output of the adder 31 is supplied to an input terminal 32a of the storing means 32.

The operation is described below. Input data is supplied to the adder 31 synchronously with the clock signal inputted from the clock input terminal 5. The result of adding the input data with the output of the storing means 32 by the adder 31 is supplied to the input terminal 32a of the storing means 32 and the contents in the storing means 32 is updated. Thus, whenever new input data is inputted synchronously with the clock signal, accumulating operation is performed by the adder 31 and the accumulating operation result is stored in the storing means 32.

As shown in FIG. 4, the adder 31 occupies a large part in the accumulator. Because the output of the storing means 32 is M bits, the adder 31 should have a constitution allowing addition of M-bit binary numbers. FIG. 5 shows a circuit constitution of an existing M-bit adder. Symbols 33a to 33e are one-bit full adders corresponding to the first bit, second bit, third bit, (m−1)-th bit, and m-th bit (most significant bit) from the least significant bit respectively. The circuit of a full adder is shown, for example, in "A Digital Processor for Decocling Composite TV Signals Using Adoptine FiHering" (IEEE Journal of Solid-State Circuits, vol. sc-21, No. 5 October 1986) by K. Murakami and others. Input data X (expressed by a binary bit string of Xm, Xm−1, ... , and X1) and input data Y (expressed by a binary bit string of Ym, Ym−1, ..., and Y1) are supplied to the first and second inputs 331 and 332 respectively constituting the input terminals 31a and 31b of the respectively-corresponding full adders 33a to 33e. The carry output of a full adder corresponding to one lower-order bit is connected to the third input (carry input) 333 of full adders 33b to 33e and the third input 333 of the full adder 33a is connected to a grounding point 34. Moreover, the output of the full adders 33a to 33e serves as the output data 0 (binary bit string of Om, Om−1, ... , and O1). Therefore, when this is used as the adder of the accumulator shown in FIG. 4, input data (N bits) is inputted to the first input 331 by extending symbols.

However, because the existing arithmetical unit including accumulating operation is constituted as described above, it requires an adder of M bits or the number of bits equivalent to the accumulating operation result. Therefore, the circuit size increases. Moreover, when the adder 31 is constituted as shown in FIG. 5, it is difficult to realize a high operation speed because the worst delay path normally serves as a path for carry propagation from the full adder 33a to the full adder 33e in FIG. 5.

To solve the above problem, the existing arithmetical unit including accumulating operation shown in FIG. 6 is proposed. This example is constituted so as to perform part of accumulating operation with an incrementer having smaller circuit constitution than the adder. In FIG. 6, symbol 1 is an adder, 2a is first storing means, 2b is second storing means, 3 is an incrementer, 4 is an input terminal, 5 is a clock input terminal, and 6a and 6b are first and second output terminals respectively. Similarly to the example in FIG. 4, input data of the accumulator consists of N bits and accumulating operation result consists of M bits (N<M). Input data is supplied to the input 1a of the first adder 1 through the input terminal 4. The adder 1 performs addition of N bits. The output of the first storing means 2a for holding data of N bits (data of low-order predetermined bits) is supplied to the second input 1b. The carry output of the adder 1 is supplied to the first input (carry input) of the incrementer 3 and the second output is supplied to the input of the first storing means 2a. The output of the incrementer 3 is supplied to the second storing means 2b for holding data of (M−N) bits (data of high-order predetermined bits) and the output of the second storing means 2b is supplied to the second input 3b of the incrementer 3. All these inputs and outputs consist of (M−N) bits.

The clock signal is inputted through the clock input terminal 5 and supplied to the first and second storing means 2a and 2b. The data stored in each storing means is updated synchronously with the clock signal. Moreover, the outputs of the first and second storing means 2a and 2b are outputted as the accumulating operation results through the first and second output terminals 6a and 6b. The data length of the both outputs is N bits (low-order predetermined bits) and (M−N) bits (high-order predetermined bits) respectively, and the accumulating operation result of total of M bits is outputted.

The following is the description of the incrementer 3 shown in FIG. 6. FIG. 7 shows a constitution of an (M−N)-bit incrementer. In FIG. 7, I (expressed by a binary bit string of I(m−n), I(m−n−1), ... , and I1) and O (expressed by a binary bit string of O(m−n), O(m−n−1), ... , and IO) show input data and output data respectively. Each of input data and output data consists of (M−N) bits. Symbols 7a to 7e show half-adders which correspond to the first bit, second bit, third bit, (M−N−1)-th bit, and (M−N)-th bit (most significant bit) starting with the least significant bit respectively. Input data is supplied to the first inputs 71 of the half-adders 7a to 7e and output data is obtained from the first output (sum output) of the half-adders 7a to 7e . The inputs 72 of the half-adders 7b to 7e are respectively provided with the second output (carry output) of a half-adder corresponding to one lower-order bit and the carry signal is supplied to the second input 72 of the lowest half-adder 7a from the carry input terminal 8. The incrementer circuit in FIG. 7 has the above constitution and performs the following operation.

(1) For carry signal="1"

O=I+1 (Output is obtained by adding 1 to input.)

(2) For carry signal="0"
O=I (Output equals input.)

The case in Item (1) shows incremental operation in which the incrementer operation is controlled by the carry signal. The incrementer customarily includes the second storing means 2b in FIG. 6. However, only the functional (1-adding) section shown in FIG. 7 is hereafter called an incrementer.

Actually, various types of circuits are considered as the half-adder circuit, which can be realized at approx. ⅔ circuit size of a full-adder circuit. For example, though a full adder requires two exclusive-OR circuits and one carry-signal generating circuit, a half adder only requires one exclusive-OR circuit and one carry-signal generating circuit.

The following is the description of the operation of the accumulator shown in FIG. 6. Input data is inputted synchronously with the clock signal inputted from the clock input terminal 5. N-bit input data is added with the output (last-time accumulating operation result of low-order predetermined bits) of the first storing means 2a. The second output of the adder 1 consisting of N-bits is supplied to the input of the first storing means 2a and the output of the adder 1 serving as the carry output of the most significant bit consisting of one bit is fetched to the carry input of the incrementer 3.

The incrementer 3 performs incremental operation in accordance with the carry input based on the accumulating operation result only when the carry signal from the addition result of low-order predetermined bits is "1", that is, carry is executed, and adds "1" to the contents of the second storing means 2b consisting of (M−N) bits (high-order predetermined bits). Unless carry is executed, the incrementer 3 inputs the contents in the second storing means 2b directly to the second storing means 2b again without incrementing the contents.

In accordance with the above operation, accumulating operation is executed whenever new data is inputted, the contents in the first and second storing means 2a and 2b are updated according to the accumulating operation result synchronously with the clock signal, and the accumulating operation result of N bits (low-order predetermined bits) and that of (M−N) bits (high-order predetermined bits) are stored.

That is, the accumulator in FIG. 6 executes the accumulating operation of M bits by incrementing the last-time accumulating operation result of (M−N) bits (high-order predetermined bits) in accordance with carry caused by the accumulating operation result of the input data of N bits (N<M) and the last-time accumulating operation result of N bits (low-order predetermined bits). Thereby, the adder 31 comprising full adders corresponding to M bits shown in FIGS. 4 and 5 is replaced with the adder 1 corresponding to N bits (N<M) and the incrementer 3 comprising half-adders corresponding to (M−N) bits, and the circuit size is decreased. Moreover, the worst delay path serves as the carry propagation path from the lowest full adder of the adder 1 to the highest half-adder of the incrementer 3 and thereby, the operation speed is increased by a value equivalent to decrease of the circuit size.

However, because the existing arithmetical unit including accumulating operation is constituted as described above, the carry propagation path from the lowest full adder of the adder 1 to the highest half-adder of the incrementer 3 serves as the worst delay path. Therefore, it is not easy to further improve the operation speed and there is a problem that, to further improve the operation speed, additional circuits are necessary and thus the circuit size increases.

The present invention is made to solve the above problem and its object is to provide an arithmetical unit including accumulating operation for realizing higher operation speed without increasing the circuit size.

SUMMARY OF THE INVENTION

An arithmetical unit including accumulating operation according to the first invention is provided with the selecting means for updating the contents in the second storing means 2b by outputting either of the last-time accumulating operation result of high-order predetermined bits stored in the second storing means 2b and the output value of the incrementer 3 in accordance with the carry signal outputted from the adder 1.

An arithmetical unit including accumulating operation according to the second invention is provided with the clock control means for updating the contents in the second storing means 2b by supplying the clock signal to the second storing means 2b in accordance with the carry and clock signals when it is judged that the contents in the second storing means 2b are updated.

In the arithmetical unit including accumulating operation according to the first invention, the selecting means 9, when the carry signal is sent from the adder 1, supplies the output of the of the incrementer 3 obtained by adding "1" to the output of the second storing means 2b showing the last-time accumulating operation result of high-order predetermined bits, and thus, the contents in the second storing menas 2b are updated.

In the arithmetical unit including accumulating operation according to the second invention, the output value of the incrementer 3 are fetched to the second storing means 2b only because the clock control means 11 supplies clocks to the second storing means 2b only when the carry signal is supplied.

The above and other objects, features, and advantages of the invention will become more apparent from the following description when taken in conjunction with the accompanying drawings.

DESCRIPTION OF THE PREFERRED EMBODIMENT

Figure 1:
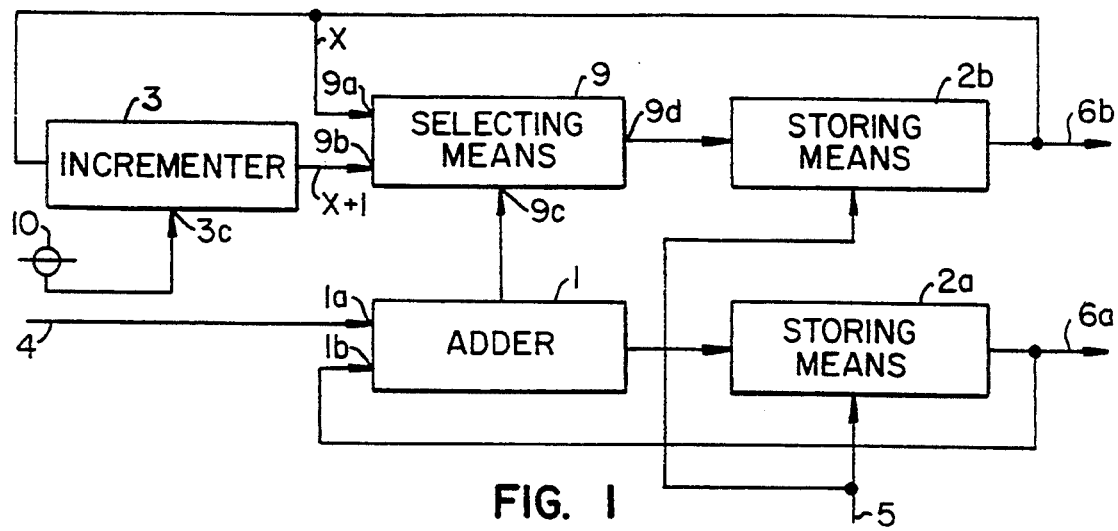
FIG. 1 is a block diagram of an embodiment of the arithmetical unit including accumulating operation according to the present invention.

FIG. 1 shows an embodiment of the arithmetical unit including accumulating operation according to the present invention. In FIG. 1, symbol 9 is selecting means comprising a multiplexer or the like, in which the output value X of the second storing means 2b is supplied to the first input 9a and the output value "X+1" of the incrementer 3 is applied to the second input 9b, and at the same time, the carry signal of the adder 1 is supplied to the control input 9c and either of the output value X of the second storing means 2b and the output value "X+1" of the incrementer 3 is selected to output the selected output value through the output terminal 9d. A power source 10 is connected to the carry signal input terminal 3c of the incrementer 3 to continuously perform incremental operation. A multiplexer serving as the selecting means can be constituted by using, for example, a plurality of 2×1 multiplexers (two-input multiplexers) or 2×1 multiplexers equal to the number of input bits.

The incrementer 3 comprises half-adders corresponding to (M−N) bits (high-order predetermined bits) in order to decrease the circuit size and the first and second storing means 2a and 2b comprise a register of N bits (low-order predetermined bits) and a register of (M−N) bits (high-order predetermined bits) respectively. Input data consists of N bits and accumulating operation result consists of M bits (N<M) similarly to the embodiment according to the prior art. In this case, the number of input bits of the multiplexer is (M−N) bits, and the (M−N)-bit output value X is supplied to one input terminal group from the second storing means 2b and the (M−N)-bit output value "X+1" is supplied to the other input terminal group from the incrementer 3, and the output value "X+1" is outputted to the second storing means 2b from the incrementer 3 in accordance with the carry signal supplied to the control input terminal of each bit.

The operation is described below.

Figure 6:
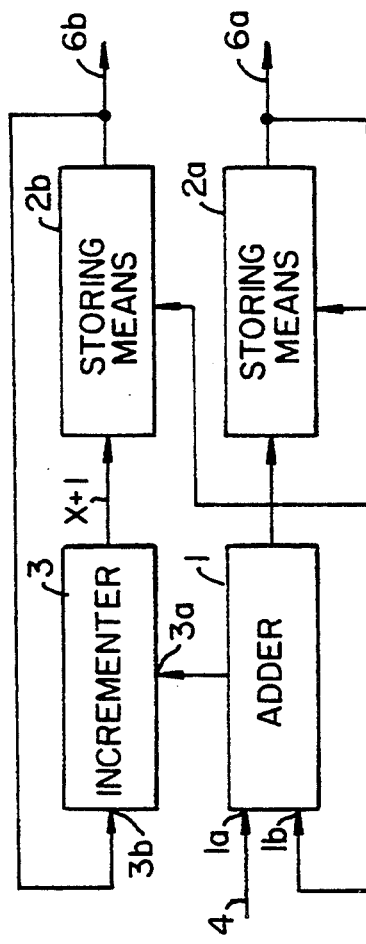
FIG. 6 is a block diagram of an existing arithmetical unit including accumulating operation.
Figure 5:
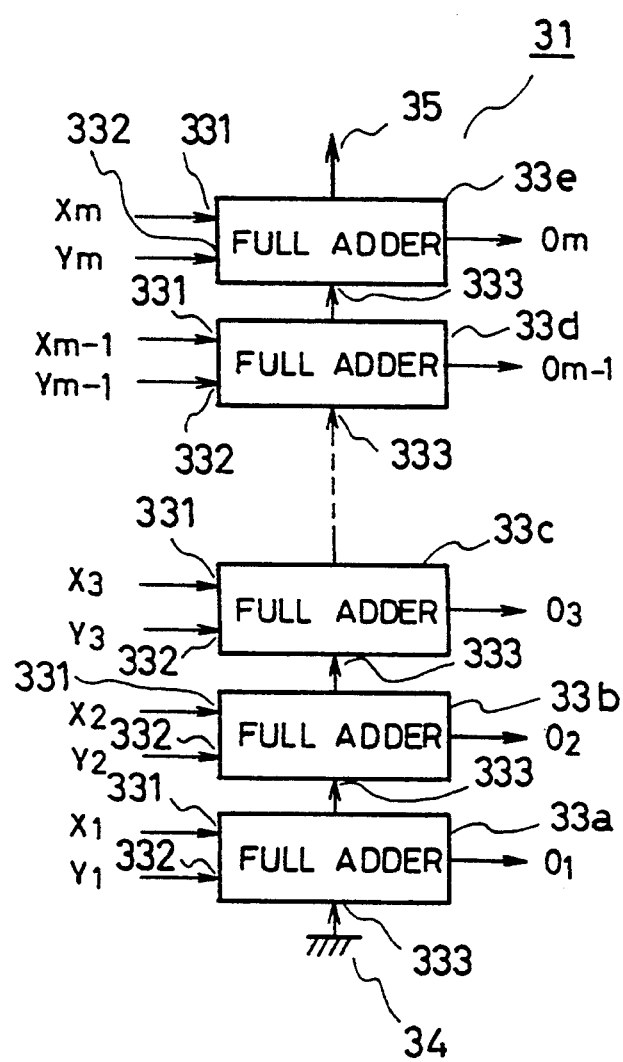
FIG. 5 is a block diagram of an existing adder comprising full adders.
Figure 7:
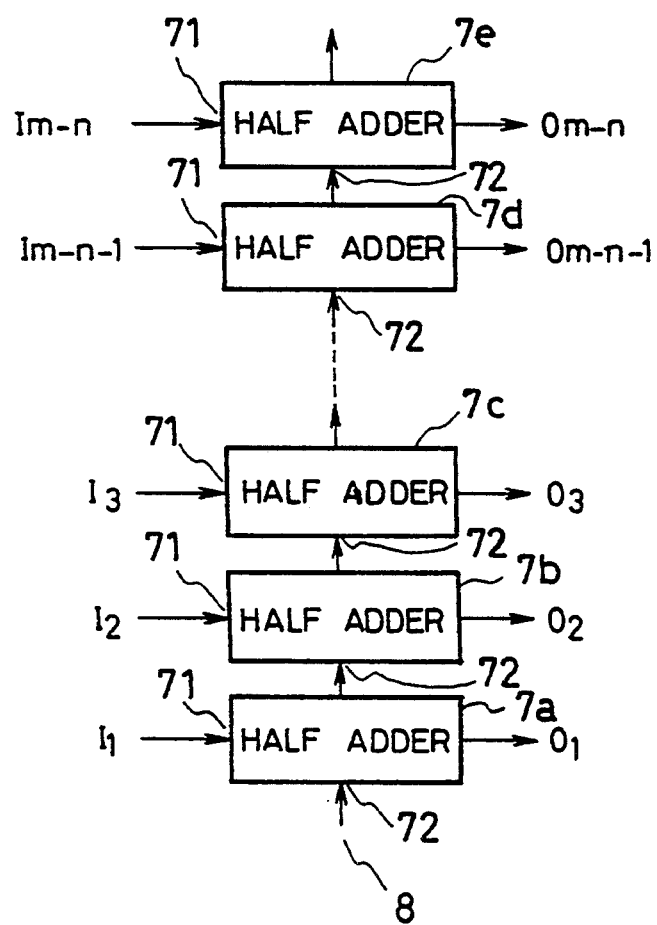
FIG. 7 is a block diagram of an existing incrementer comprising half-adders.

The following is the description of the differences between the operations of the accumulator in FIG. 1 and the accumulator in FIG. 6. In the following description, the selecting means 9 fetches and outputs the output value X of the second storing means 2b when the carry signal is "0" and the output value "X+1" of the incrementer 3 when the signal is "1".

The adder 1 and first storing means 2a perform the same operation as the accumulator in FIG. 6. Therefore, whenever addition is executed, the carry signal "1" is outputted to the input of the selecting means from the carry output of the adder 1 when carry occurs and the carry signal "0" is outputted to it when no carry occurs. Because the carry signal is supplied to the control input 9c of the selecting means 9, the output value "X+1" of the incrementer 3 is supplied to the input of the storing means 2b as the output of the selecting means 9 when carry occurs and the output value X of the second storing means 2b is supplied to it when no carry occurs. Differently from the accumulator in FIG. 6, the incrementer 3 continuously performs incremental operation because the carry input of the incrementer 3 is connected to the power source 10 and continuously provided with "1". Therefore, also for the accumulator in FIG. 1, either of the value "X+1" obtained by incrementing the last-time accumulating operation result X of (M−N) bits as high-order predetermined bits or the value X obtained by incrementing no accumulating operation result is resultingly stored in the second storing means 2b depending on whether or not carry occurs due to addition result of N bits as low-order predetermined bits similarly to the example according to the prior art shown in FIG. 6.

The worst delay path of the accumulator of the prior art shown in FIG. 6 serves as the carry propagation path for M bits from the lowest full adder of the adder 1 to the highest half-adder of the incrementer 3. However, the worst delay path of the accumulator of the present invention in FIG. 1 results in the slower one of the carry propagation path passing through the full adder of N bits (N<M) and the carry propagation path passing through the half-adder of (M−N) bits. That is, because the incrementer 3 is constituted so that it always starts operation simultaneously with and in parallel with the adder 1, the worst delay path via the both adders is not produced and the operation can be accelerated. This effect can also be obtained by adding only a few circuits.

Figure 2:
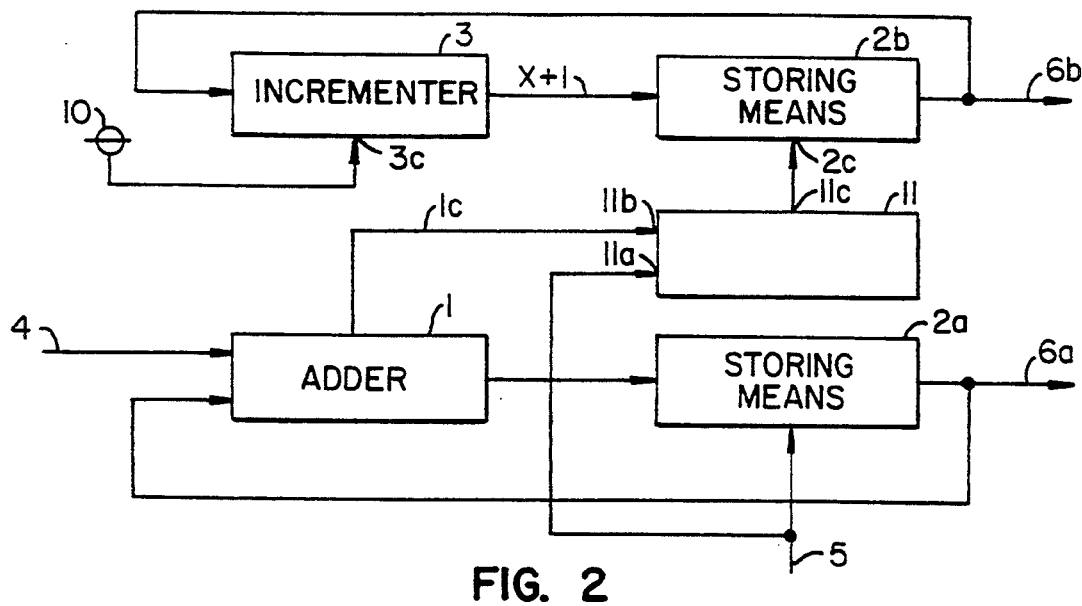
FIG. 2 is a block diagram of another embodiment of the arithmetical unit including accumulating operation according to the present invention.
Figure 4:
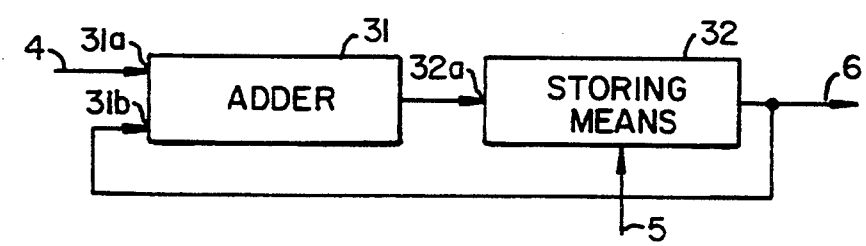
FIG. 4 is a block diagram of an existing arithmetical unit including accumulating operation.

FIG. 2 shows another embodiment of the arithmetical unit including accumulating operation according to the present invention. In FIG. 2, the same objects as in FIG. 1 are provided with the same symbols and their description is omitted. In FIG. 2, symbol 11 is a clock control circuit comprising a two-input AND gate or the like, in which a clock signal is supplied to the first input (clock signal input) 11a through the clock input terminal 5, a carry signal is supplied to the second input (control input) 11b from the adder 1, and the output terminal 11c of the circuit is connected to the clock input terminal 2c of the second storing means 2b (second invention). The clock control circuit 11 outputs clocks inputted from the clock input terminal 5 in accordance with the carry signal.

Because the carry signal input terminal 3c of the incrementer 3 is connected to the power source 10 similarly to the case in FIG. 1, the incrementer 3 continuously performs incremental operation.

The basic operation of the accumulator of this embodiment is almost the same as that of the accumulator in FIG. 1. Therefore, only differences between them are described below.

For the accumulator in FIG. 2, similarly to the accumulator in FIG. 1, the incrementer 3 continuously performs incremental operation. Therefore, the accumulator according to this embodiment is controlled according to whether or not to update the contents in the second storing means 2b, in other words, whether or not to provide the second storing means 2b with the clock signal instead of deciding whether or not to increment the contents in the second storing means 2b in accordance with the carry signal 1C outputted from the adder 1 corresponding to low-order bits. Therefore, the clock signal is given from the clock input terminal 5 for each accumulating operation and the data in the first storing means 2a is updated every accumulating operation. However, the clock signal is given to the second storing means 2b from the first output only when the carry signal is set to "1" and the data stored in the second storing means 2b is incremented and updated.

By using the constitution of this embodiment, it is possible to obtain the same effect as that of the embodiment in FIG. 1, constitute the clock control circuit 11 with an AND gate or the like, add only a few circuits, and decrease the circuit size.

For the above embodiments, means for initializing the first and second storing means 2a and 2b is not described but it is necessary in actual hardware. However, the description of the means is omitted because it does not influence the description of accumulating operation, circuit size, or operation speed.

For the above embodiments, the number of low-order predetermined bits (adder 1) is set to N bits and the number of high-order predetermined bits (incrementer 3) is set to (M−N) bits. However, it is also possible to set the former to (N+1) bits and the latter to (M−N−1) bits. However, it is impossible to set the number of low-order predetermined bits to less than N bits (number of bits of input data) because overflow occurs.

Figure 3:
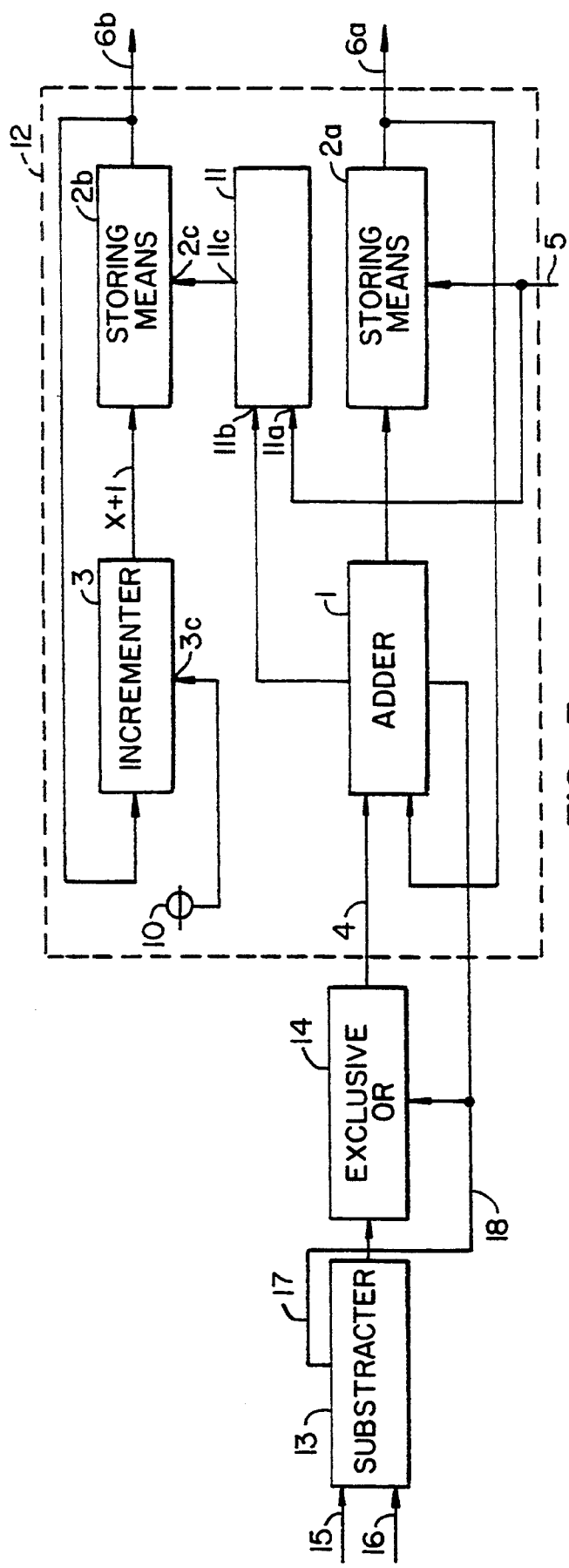
FIG. 3 is a block diagram of the arithmetical unit including accumulating operation according to the present invention applied to a differential absolute value sum arithmetical unit.

FIG. 3 is a block diagram of an embodiment of the arithmetical unit including accumulating operation according to the present invention applied to a differential absolute value sum arithmetical unit. Objects in FIG. 3 same as those in FIG. 2 are provided with the same symbols and their description is omitted. In FIG. 3, symbol 12 is an accumulator, 13 is a subtracter, 14 is an exclusive OR circuit, 15 is a minuend input terminal, 16 is a subtrahend input terminal, and 17 is a sign-bit output of subtracter 13 for indicating the sign for subtraction result. Minuend data and subtrahend data are inputted to the minuend input and subtrahend input of the subtracter 13 through the minuend and subtrahend input terminals 15 and 16 respectively to supply the sign-bit output 17 of the subtracter 13 to the first input (control input) of the exclusive OR circuit 14 and the carry input 18 of the accumulator 12 and also supply differential data to the second input (data input) of the exclusive OR circuit 14. The output of the exclusive OR circuit 14 is fetched from the input of the accumulator 12 and accumulated and the differential absolute value sum computation result is outputted through the first and second output terminals 6a and 6b.

The operation is described below. For the following example, it is assumed that every data value is a binary number expressed by the complement of 2. A subtrahend is subtracted from a minuend in the subtracter 13 and the differential data is inputted to the exclusive OR circuit 14. In this case, because the sign for the differential data is outputted to the sign-bit output 17 of the subtracter 13, the absolute value of the differential data can be given to the accumulator 12 by using the output signal. That is, the following operation is performed.

(1) When the differential data is positive (sign-bit output="O") The exclusive OR circuit 14 directly outputs the input and gives "O" to the carry input 18 of the accumulator 12.

(2) When the differential data is negative (sign-bit output="1")

The exclusive OR circuit 14 bit-reverses and outputs the input and gives "1" to the carry input 18 of the accumulator 12. Processing is completed by accumulating the absolute value of the given differential data through the above operation.

FIG. 3 shows an example in which the accumulator of the embodiment in FIG. 2 is applied. However, it is also possible to apply the accumulator of the embodiment in FIG. 1. In any case, a high-speed differential absolute value sum arithmetical unit can be obtained without increasing the circuit size.

Though the carry input of the adders in FIGS. 1 and 2 is grounded, it can easily be used as the first input terminal of the accumulator 12.

Because the first invention is provided with selecting means for updating the contents in the second storing means by supplying either of the last-time accumulating operation result of high-order predetermined bits stored in the second storing means and the output value of the incrementer to the second storing means in accordance with the carry signal outputted from the adder, the incrementer 3 can be constituted so that it always starts operation simultaneously with and in parallel with the adder 1. Therefore, the worst delay path is not produced which passes through both the incrementer 3 and adder 1 like the embodiment of the prior art. Thus, slower one of the carry propagation paths of the incrementer 3 and adder 1 serves as the worst delay path and the operation speed can be increased by adding only a few circuits.

Because the second invention is provided with clock control means for updating the contents by supplying the clock signal to the second storing means in accordance with the carry signal, the same effect as the first invention can be obtained because the operation speed can be increased by adding only a few circuits without increasing the circuit size.

What is claimed is:

1. An arithmetical unit for performing an accumulation operation on binary numbers including a first predetermined number of bits and forming an accumulation result being a binary number including a second predetermined number of bits, with the bits in the accumulation result grouped into said first predetermined number of low-order bits and a third predetermined number, equal to the difference between the first and second predetermined numbers, of high-order bits, said arithmetic unit comprising:

first storing means, having an input port, an output port, and a clock signal input for receiving a first clock signal, for latching the low-order bits of said accumulation result when said first clock signal is asserted, second storing means, having an input port, an output port, and a clock signal input for receiving a second clock signal, for latching the high-order bits of said accumulation result when said second clock signal is asserted, an adder, having first and second input ports, an output port, and a carry output that provides a carry signal, with the first input coupled to receive an input binary number having said first predetermined number of bits, a second input port coupled to the output port of said first storing means, and an output port coupled to the input port of said first storing means, said adder for adding said input signal and said low-order bits of said accumulation result to output the low-order bits of an updated accumulation result and for asserting the carry signal if a carry is generated, an incrementer, having an input port coupled to the output port of said second storing means and an output port coupled to the input port of said second storing means, for outputting an incremented value obtained by incrementing the high-order bits latched by the second storing means, and;

a logic circuit, having inputs coupled to receive said first clock signal and said carry signal, for asserting said second clock signal in synchronism with said first clock signal only when said carry signal is asserted so that the incremented value is latched by said second storing means only when said carry signal is asserted.

2. An arithmetical unit according to claim 1, wherein the logic circuit comprises an AND gate having an input terminal coupled to receive the carry signal from the adder, a clock signal input terminal, and an output terminal for sending said second clock signal to the second storing means as a clock signal when both the carry and clock signals are asserted.

3. An arithmetical unit according to 1, wherein the first storing means comprises a register of N bits smaller than M bits, the second storing means comprises a register of (M−N) bits, and the incrementer comprises (M−N) 1-bit half-adders so that M-bit data can be fetched from the outputs of first and second storing means.

4. An arithmetical unit including accumulating operation according to claim 1, wherein a carry signal input terminal of the incrementer is connected to a power source so that the incrementer continuously performs increment ingh operation.

5. An arithmetical unit according to claim 1, wherein said adder has a carry input terminal and further comprising:
 a subtracter having a minuend input terminal, a subtrahend input terminal, a sign-bit output terminal, and differential data output terminal, with the sign-bit output terminal coupled to the carry input terminal of said adder;
 an exclusive OR circuit having an input coupled to the differential data output of the subtractor and an output coupled to the first input of the adder to constitute a differential absolute value sum arithmetical unit.

* * * * *